(12) United States Patent
Satoh

(10) Patent No.: US 6,928,439 B2
(45) Date of Patent: Aug. 9, 2005

(54) COMPUTER SYSTEM WITH ACCESS CONTROL MECHANISM

(75) Inventor: Yoshihiro Satoh, Miyoshi-machi (JP)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 09/745,897

(22) Filed: Dec. 21, 2000

(65) Prior Publication Data

US 2002/0059236 A1 May 16, 2002

(30) Foreign Application Priority Data

Dec. 28, 1999 (JP) ............................................ 11-374923

(51) Int. Cl.⁷ .............................................. G06F 17/30
(52) U.S. Cl. ................................ 707/9; 707/1; 709/203
(58) Field of Search ................................ 707/9, 1, 3, 5, 707/104.1, 103 Y, 10; 709/203, 219, 202; 710/200

(56) References Cited

U.S. PATENT DOCUMENTS

| 5,787,428 A | * | 7/1998 | Hart .............................. 707/9 |
| 6,032,216 A | * | 2/2000 | Schmuck et al. ........... 710/200 |
| 6,047,288 A | * | 4/2000 | Kurosawa et al. ............. 707/9 |
| 6,236,996 B1 | * | 5/2001 | Bapat et al. .................... 707/9 |
| 6,338,082 B1 | * | 1/2002 | Schneider .................... 709/203 |
| 6,374,259 B1 | * | 4/2002 | Celik ........................ 707/104.1 |
| 6,687,745 B1 | * | 2/2004 | Franco et al. ................ 709/219 |

FOREIGN PATENT DOCUMENTS

| JP | 07-098669 | 4/1995 | ............ G06F/12/00 |
| JP | 10-145543 | 5/1998 | ............ H04N/1/00 |
| JP | 10-240690 | 9/1998 | ............ G06F/15/00 |

* cited by examiner

*Primary Examiner*—Charles Rones
*Assistant Examiner*—Hassan Mahmoudi
(74) *Attorney, Agent, or Firm*—William A. Kinnaman, Esq.; Kevin P. Radigan, Esq.; Heslin Rothenberg Farley & Mesiti, P.C.

(57) ABSTRACT

According to the present invention, a computer system with a mechanism for controlling the access rights for data to be used in common by multiple users, which includes: data storage for the storing data in common; an access management table including access management data for controlling access rights for the data in common; and control mechanism for updating the access management data in response to communication from a user who is authorized to grant access rights. Included in the data in the access management table is information for data to be accessed, identification information for a user who has been granted access rights, access level information and identification information for the user who grants the access rights.

9 Claims, 3 Drawing Sheets

| Data ID | User ID | Authorized levels | Granter |
|---|---|---|---|
| 0001 | UserA | WRITE/DEL | -- (Creator) |
| 0001 | UserB | READ | UserA |
| 0001 | UserC | READ | UserB |
| ⋮ | ⋮ | ⋮ | ⋮ |
| nnnn | xxxx | wwww | yyyy |

Fig. 2

COMPUTER SYSTEM WITH ACCESS CONTROL MECHANISM

CROSS-REFERENCE TO RELATED APPLICATION

This application claims priority from Japanese patent application number 11-374923,filed Dec. 28, 1999, which is hereby incorporated herein by reference in its entirety.

FIELD OF THE INVENTION

The present invention relates to a computer system whereby a number of users on a network are enabled to use data in common, and relates in particular to a computer system whereby access rights to such data are easily granted.

BACKGROUND OF THE INVENTION

As development of the Internet and groupware environments has progressed, an exchange of electronic data has been more and more frequently performed, not only between individuals, but also among members within a company in various business transactions. For example, electronic data for various slips, contracts and other documents may be exchanged by users within a specific area. Since such data are often used in common by a number of different users for convenience, data access management procedures must be established to provide protection for the data and to prevent unauthorized or illegal use by outsiders.

Generally, person in charge of controlling data access rights (called a manager) is responsible for providing an appropriate level of access management. For example, an original author or creator who has created a specific document file, or a person who is authorized to grant a right to access the file (hereinafter collectively referred to as a "granter"), designates the users or user groups who should be permitted to use the document file for the manager (the manager may also be the granter). Then, the manager enters and records the designated permissions by granters in a system, so that only the designated users can access the document file. That is, users can not refer to data that are used in common by multiple users until after they have been granted permission to access such data by the granter directly or through the manager, as well as after they have been reported reference information for data they want to access.

It should be noted that when the term "report (transmit or notify of) reference information" is used hereinafter, it does not mean transmission of data per se. It means transmission of information that is required to access such data. While the detailed operations differ depending on the function of applications that are employed, "reporting reference data" corresponds, for example, to transmission of database icons which are created within an electronic mail by using a NOTES system, a groupware product that is available from Lotus Development Corp.

In certain case, wherein a number of persons are authorized to grant access rights for the same data, each person so authorized can arbitrarily select users to whom data access rights are to be granted. Therefore, it tends to be difficult to trace and specifically identify the authorizing person who approved access rights to a specific user.

In the real world, it is assumed that the right to access a specific document is granted a person when he or she receives the document. For example, when an author A hands a specific document to person B, since the author A has in effect granted person B permission to read the document (=grants an access right), person B can read the document (=can actually access or refer to). That is, in normal transactions in the real world, the granting of access rights to data and the act of referring to the data can be performed at the same time. However, in a conventional computer system, before a user is permitted to refer to data, permission to access the data must be provided for the user. That is, in a conventional computer system, since permission to access data must be granted in advance, one more extra step is required than is needed in the real world situation.

Further, in the real world, the history of granting access permission can be understood by tracing the route from which a document is obtained. But in a conventional computer system, since the record of procedures by which access permission is granted is not retained, or is retained only as a time log for the whole data, it is difficult to trace historical data concerning who approved the granting of access permission for specific data.

SUMMARY OF THE INVENTION

An object of the present invention is to provide a computer system for controlling access rights concisely in an environment wherein a number of users on a network use data in common.

The present invention resolves the above problem. More specifically, when the reference information for data to be used in common is transmitted in communication such as an electronic mail from a granter to another user, information including the name of target data and of the user who is permitted to access the data is automatically obtained and a command granting access rights is automatically issued, so that access management data can be updated in the process of user communication. The access management system includes: an access management table for managing the access right information; and a control unit for processing this table. Upon receiving the access right command, the system automatically updates the table value. The access rights to be granted can be set to provide various levels of access (READ permission only, etc.) by using a standard value (default value) or a value set by the granter. In addition, information concerning the originator who transmitted the mail (=the granter) is also automatically obtained, and data concerning who approved the access to the pertinent data are stored in the access management table. As a result, the route by which the data is acquired is also easily ascertained.

More specifically, the present invention is implemented as a computer system with a mechanism for controlling access to data to be used in common by multiple users comprises data storage for storing the data in common, an access management table including access management data for controlling a right to access the data in common, and control means for updating the access management data, in response to communication forwarded by a user who is authorized to grant an access right.

The access management data in the access management table may include identification information for data to be accessed, identification information for a user who is granted access rights, access level information and identification information for the user who grants the access rights. Since the control means may update the access management data upon the receipt of a command that is issued during the above mentioned communication, the grant process can be more easily performed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 is a diagram for explaining an access management table for determining the access rights granted for common data.

DESCRIPTION OF THE SYMBOLS

Figure 1:
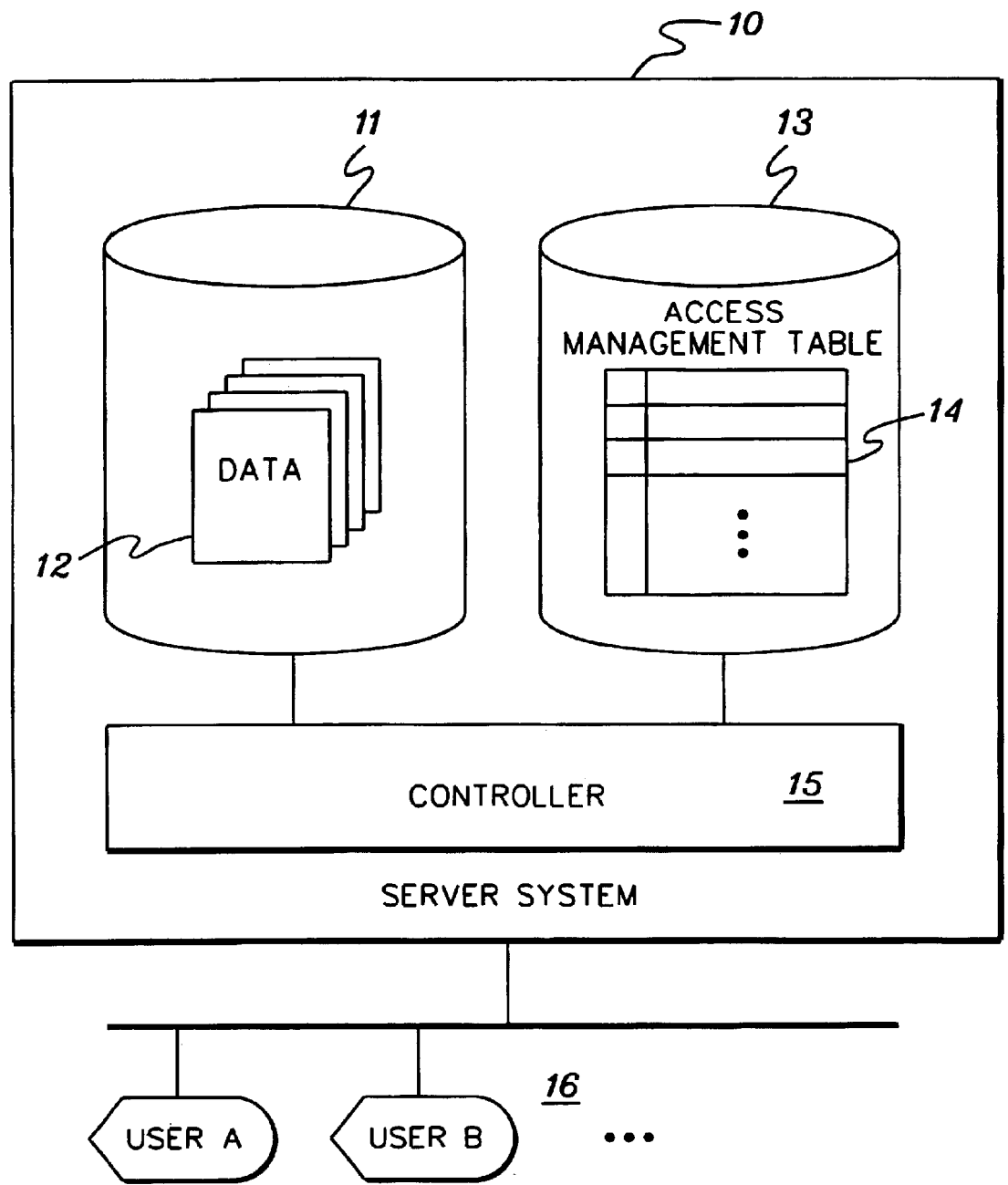
FIG. 1 is a block diagram for explaining the system arrangement including a computer system according to the present invention.

10: Server system
11: Data storage unit
12: Common data
13: Table storage unit
14: Access management table
15: Control unit
16: User terminal

DETAILED DESCRIPTION OF THE INVENTION

The preferred embodiment of the present invention will now be described. FIG. 1 is a block diagram for explaining the arrangement of a communication system that includes the computer system of the present invention. In FIG. 1, a server system 10 according to this invention comprises a data storage unit 11, a table storage unit 13, and a control unit 15. The data storage unit 11 stores common data 12, as well as other data. When the server system 10 also serves as a mail server, the data storage unit 11 can also store mail data for each user. The table storage unit 13 stores various control tables, such as an access management table 13 which is a table for controlling data access information. The control unit 15 receives requests from a user terminal 16, which also serves as a client system, and adds to, deletes or updates table data held in the table storage unit 13. Further, the server system 10, when serving as a mail server, performs predetermined mail processing. Although only two user terminals 16 are shown in FIG. 1 to avoid complexity in the drawing, more terminals may be connected via a LAN, the Internet or another network. In addition, although the communication system is arranged as a client-server model system, it may also be set up as another system. While the data storage unit 11 and the table storage unit 14 are separately provided, they may be provided as a single unit, or they may be broken down into more units, as in a distributed model system. Furthermore, while the control unit 15 is positioned in the server system 10, it may instead be positioned in another system (e.g., in a client terminal), so long as it is authorized to operate the table.

A specific user or group employing the user terminal 16 can access the common data 12 within the permitted limits as specified in the access management table 14. Management of such access can be performed by the control unit 15. For example, when user B accesses data X, the control unit 15 of the server system 10 checks the contents of the access management table 14. In this case, if the access rights for data X are granted to user B, then user B is permitted to access the data, and if access rights are not granted, then access to the data by user B is inhibited. Generally, the contents of the access management table 14 are determined in advance by a granter (e.g. an author or creator of the target data) or a manager, who can determine the access rights to the pertinent data.

According to the present invention, the access management table 14 is automatically updated when a granter transmits an e-mail to a predetermined user. Therefore, the granter (or the manager) does not need to update the table in advance. This operation will now be described while referring to FIG. 1. First, assume that user A is a granter authorized to grant an access right to data X and that user B is, upon receipt of an e-mail transmitted by user A, granted access permission for the data X referred to in the e-mail. In this case, since the e-mail that user A prepares for user B includes reference information for the data X, user B is thereby notified that the target data X are available and can be accessed. In this invention, when an e-mail is transmitted, a command (table update command) is created and issued to update the contents of the access management table 14. This command may include, as parameters, the identification information of target data (X), the user who is permitted access (B) and the granter (A), and the permission level (e.g. READ only permission). Upon receiving the table update command, the control unit 15 rewrites the contents of the table 14, and as a result, the right to access data X is granted user B. Since user B is thus granted the right to access data X when he or she receives the mail from user A based on the reference information included in the e-mail, user B can immediately access the data X.

In the above explanation, the command is created and issued at the user terminal upon transmission of an e-mail. However, the control unit of the server system may update the table in accordance with a request from the user. For example, when the server system 10 also functions as a mail server, it may perform corresponding table processing in accordance with designation by a user transmitting an e-mail.

FIG. 2 is a diagram for explaining the access management table to determine the access rights for common data. In FIG. 2, entered in a data ID column 21 are unique data identifiers assigned for each data sets; entered in a user ID column 22 are the names of users or user groups for which the access right levels for the data have been specified; entered in an authorized level column 23 are access right levels that are specified for the corresponding users or user groups; and entered in a granter column 24 are the names of the granters who granted the access rights to the corresponding users or user groups. Since the creator of data owns access right for such data and receives no access rights from anyone, in the granter column 24 there is either no entry or the same user name is entered as the one that is shown in the user ID column 22. When a notification of reference information concerning specific data is transmitted, the user who transmits the pertinent notification is entered in the granter column 24, and the user who receives the notification is entered in the user ID column 22. In a system that does not particularly require a history of the granting of access rights, the granter column 24 in the access management table is not required. Further, in the authorized level column 23 in FIG. 2, only two entry types: "WRITE/DEL" (writable/deletable) and "READ" (readable) are shown. However, another arbitrary setup, such as a parameter that permits the transmission (FORWARD) of data to another user, may be included in column 23. In this case, if no particular value is entered, "READ" (FORWARD disabled) is set as a default value, while if a specific value for transmission is entered, an arbitrary value can be set.

Figure 3:
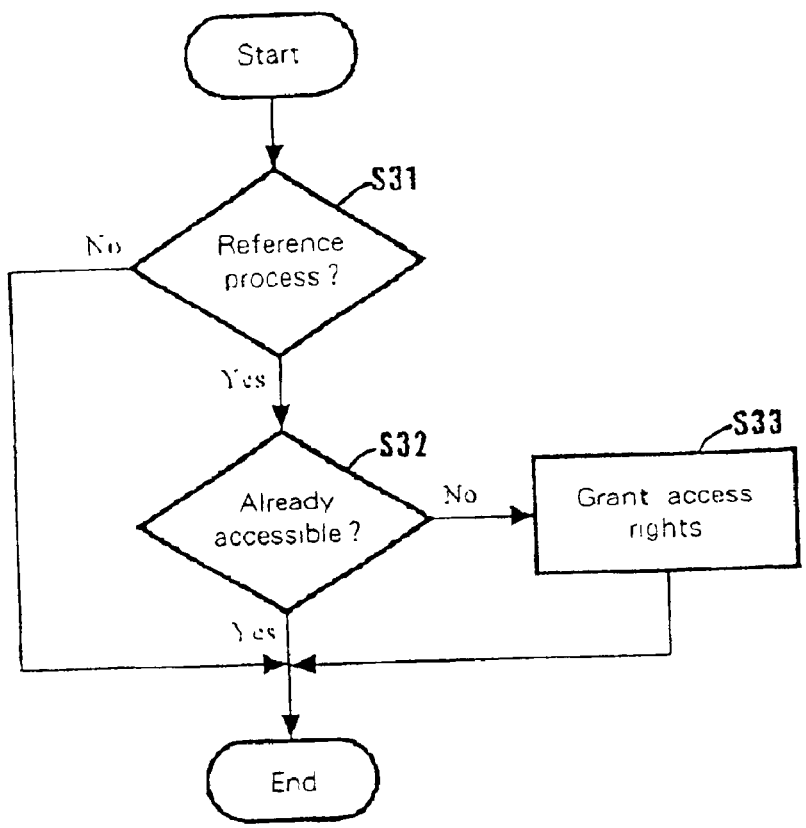
FIG. 3 is a flowchart for explaining a process performed by a data access control method according to the present invention.

FIG. 3 is a flowchart for explaining the data access control method of this invention. The process shown in FIG. 3 is performed by the control unit 15. First, upon receipt of a request from the user terminal 16, a check is performed to determine whether reference information for the common data 12 is included in a communication or in an e-mail that is transmitted to a specific user or user group (step 31). When a command including a predetermined parameter is issued as described in above, it is determined that the reference process is required, and the parameter information is employed as the reference information for the common data. When the reference process is required, program control goes to step 32, whereat the contents of the access management table 14 are checked to determine whether access rights have already been granted to the recipient of the communication. When access rights have already been granted, no further process is performed. But when access rights have not yet been granted, at step 33, the data ID 21, the user ID 22, the authorized level 23, and the granter 24 shown in FIG. 2 are entered in the access management table 14 in accordance with the reference information requested by the user. As a result, at the time of transmission of an e-mail, access rights can be provided for a recipient, and a record covering a history of granting access rights can be retained.

As is described above, according to the present invention, control for accessing data for a specific user or user group can be provided by an easy operation, and the efficiency of the process can be improved. Further, since precise data concerning a person who is authorized to grant access rights (a granter) are available, a route along which data are acquired can be easily grasped.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer system for controlling access to data to be used in common by multiple users, comprising:

data storage for storing said data in common;

an access management table including access management data to control an access right to said data in common; and control means for automatically updating said access management data in said access management table, concurrent with and in response to transmitting a communication, in which reference information to said data in common are included, from a first user who is authorized to grant an access right to said data to a second user, wherein the second user is granted the access right to said data pursuant to the automatic updating of said access management data responsive to the transmitting of the communication.

2. The computer system according to claim 1, wherein said access management data in said access management table includes identification information for data to be accessed, identification information for said second user to whom the access right to said data has been granted, and access level information.

3. The computer system according to claim 2, wherein said access management data in said access management table includes identification information for said first user who grants the access right to the second user.

4. The computer system according to claim 3, wherein said control means automatically updates said access management data in response to a command that is automatically issued during said transmitting of the communication.

5. The computer system according to claim 4, further comprising a plurality of user terminals for communicating with said computer system.

6. The computer system according to claim 2, wherein said control means automatically updates said access management data in response to a command that is automatically issued during said transmitting of the communication.

7. The computer system according to claim 1, wherein said control means automatically updates said access management data in response to a command that is automatically issued during said transmitting of the communication.

8. The computer system according to claim 1, wherein said access management table resides on a server external to the first user and the second user.

9. A communication system comprising:

a computer system for controlling access to data to be used in common by multiple users, comprising:

data storage for storing said data in common;

an access management table including access management data to control an access right to said data in common; and control means for automatically updating said access management data in said access management table, concurrent with and in response to transmitting a communication, in which reference information to said data in common are included, from a first user who is authorized to grant an access right to said data to a second user, wherein the second user is granted the access right to said data pursuant to the automatic updating of said access management data responsive to the transmitting of the communication.; and a plurality of user terminals for communicating with said computer system.

* * * * *